United States Patent Office 3,223,100
Patented Dec. 14, 1965

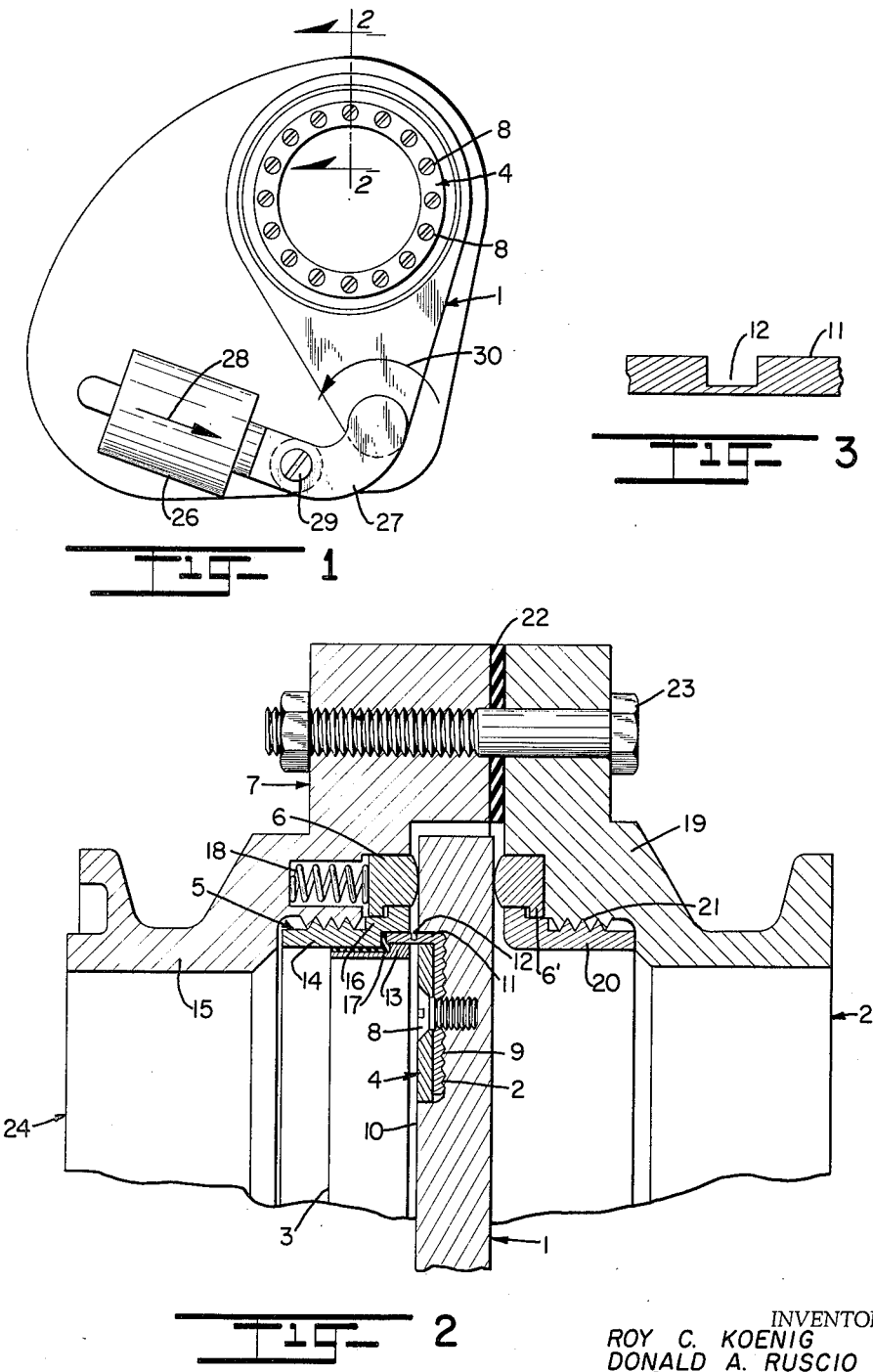

3,223,100
SHEARABLE SEALING MECHANISM FOR A
PIVOTED GATE VALVE
Roy C. Koenig and Donald A. Ruscio, Denver, Colo., assignors to The Martin Marietta Corporation, Baltimore, Md., a corporation of Maryland
Filed May 11, 1962, Ser. No. 194,037
1 Claim. (Cl. 137—68)

This invention relates to a blade valve or pivot type gate valve wherein the valve element is provided with a pre-use peripheral mechanical sealing means, and in particular to a fuel storage valve of this type.

A fuel storage valve used in connection with the long term storage of fuel, such as hydrocarbon fuel, used as a liquid propellant for a missile, or cryogenic fuel is required to be free of leakage until the valve is actuated. When it is desired to actuate the valve, it should be possible to break the seal without difficulty and no fragments of metal or other material should be formed to enter the fuel flow line or jam the valve. After the valve has been actuated to supply a quantity of fuel from storage, it should be possible to shut down the flow of fuel so that leakage of fuel will be minimized until another pre-use sealing means can be installed. The blade or gate upon opening should be completely removed from the fluid flow area so that a full rate of flow is produced with the production of minimum pressure drop, turbulence or fluid loads against the valve element.

Accordingly, it is an important object of this invention to provide a blade or gate valve sealing mechanism and valve assembly wherein leakage is prevented over prolonged periods of non-use of the sealed valve.

Another object is to provide such a valve assembly wherein the sealing mechanism can be broken upon actuation of the valve and the valve subsequently can be closed with minimum leakage of fluid.

A further object is to provide such a valve assembly wherein the sealing means can be broken without difficulty and without the production of fragments of material which will enter the fluid flow line or jam the valve.

An additional object is to provide such a valve wherein the valve element is completely removed from the fluid flow line when the valve is actuated and a full rate of fluid flow is produced with minimum pressure drop, turbulence or fluid loads upon the valve element.

Additional objects will become apparent from the following description of the invention, which is given primarily for purposes of illustration and not limitation.

Stated in general terms, the objects of the invention are attained by providing a pre-use peripheral mechanical sealing means, preferably in the form of a cup-shaped metallic diaphragm, for a blade or gate type valve, such as can be used with a fuel storage tank. The diaphragm preferably is provided with a base portion and a lip or annular flange portion which extends normal to the valve blade from the base portion and is provided with a reduced or weakened section for convenient, positive shearing or breaking of the seal upon initial actuation of the valve blade. After initial actuation, the blade preferably operates in its normal fluid flow control capacity riding between bearing and sealing rings or elements.

A more detailed description of a specific embodiment of the invention is given with reference to the accompanying drawing, wherein:

FIG. 1 is a schematic plan view from the upstream side of the valve showing the valve in a housing and having its blade connected to a pneumatic actuating motor;

FIG. 2 is a partial sectional view taken along line 2—2 of FIG. 1, but drawn to an enlarged scale, and with portions broken away; and FIG. 3 is an enlarged, partial detail view of a cross-section of the lip of the diaphragm showing the reduced or weakened zone where shearing of the diaphragm takes place.

Referring to FIG. 2, the sealing mechanism of the invention includes a shear blade 1, a circular diaphragm 2, a metal ring 4, a circular cutter 3, a retainer 5 and two fluorocarbon plastic or resin rings 6 and 6'. The shear blade 1, which also serves as the valve blade or gate member, is sealed against fluid flow, to the upstream valve body or housing 7 when the valve is closed and in the pre-use condition shown in FIG. 2. This is accomplished by the circular metal diaphragm 2, which is mechanically attached to the blade 1 and to the valve body 7. The attachment is accomplished by screws 8 which fasten the base portion 9 of the diaphragm 2 and ring 4 to the upstream side 10 of the blade 1. The heads of the screws 8 and ring 4 are flush with the side 10 of blade 1. The tapped holes into which screws 8 are threaded do not pass completely through blade 1. The metal ring 4 and the base portion 9 of diaphragm 2 are fitted into an annular channel formed concentrically in the upstream side 10 of blade 1 as shown in FIG. 2.

The annular lip or flange 11 of diaphragm 2 is provided with an annular groove 12 as best shown in FIG. 3, which produces an annular shear area about midway on the lip. This area is strong enough to serve as a fluid seal during pre-use but sufficiently weak to be sheared with ease upon actuation of the valve, as described hereinbelow. The lip 11 extends at right angles from the blade 1. Thus a metal-to-metal seal is established between the cup-shaped diaphragm 2 and blade 1.

The generally cylindrical cutter 3 is provided with an enlarged cutting section 13 which fits snugly inside lip 11 of diaphragm 2. Cutter 3 in turn is fitted snugly inside a retainer 5. Retainer 5 is threaded, as shown at 14, into the inside of upstream valve housing section 15 and is provided with flange portion 16 which fits snugly over the outer portion of lip 11. A sealing agent, such as an epoxy resin, is coated on the threads at 14, of retainer 5, on the outside surface of cutter 3 and the surface of the outer portion of lip 11, as indicated at 17 to seal all spaces between the adjoining surfaces of housing section 15, retainer 5, cutter 3 and diaphragm 2. Epoxy resin, if used as the sealing agent, is appropriately cured.

Upstream fluorocarbon plastic ring 6 is fitted snugly around the outside of flange portion 16 of retainer 5 and in an annular groove formed in valve housing section 15. Fluorocarbon plastic ring 6 is urged in sealing engagement with blade 1, which, in turn, is urged in sealing engagement with the other fluorocarbon plastic ring 6' by spiral springs 18 housed in holes formed in valve housing section 15, as shown in FIG. 2. The second-mentioned fluorocarbon plastic ring 6' is fitted in an annular groove formed in downstream valve housing section 19, and is held in position in the groove by a retainer 20 threaded into section 19 at 21.

A seal gasket 22 is positioned between valve housing sections 15 and 19 to seal blade 1 against leaks after the valve has been actuated and diaphragm 2 has been sheared. The valve housing sections 15 and 19 are fastened together by nut and bolt assemblies 23. Valve housing section 15 is adapted to connect to an upsteram pipe section 24 and section 19 is connected to a downstream pipe section 25.

As shown in FIG. 1, the valve is operated by pneumatic pressure in the piston chamber 26, shown schematically, which forces the lever arm 27 in the direction of arrow 28. The lever arm 27 is connected to blade 1 by a spline shaft 29. The blade 1 is rotated in the direction of arrow 30 and diaphragm 2 is sheared neatly and cleanly at the annular groove 12 which forms the shear area. The shearing takes place because a torque is applied to the diaphragm 2 by the rotation of blade 1. The outer portion of lip 11 of diaphragm 2 is held in a fixed position in valve housing section 15 by cutter 3 and retainer 5. Because of the close clearance between blade 1 and cutter 3, the sharp annular edge of cutter 3 adjacent groove 12, and the weakness of the shear area formed by groove 12, the seal is very satisfactorily sheared. Shearing begins at one spot in the groove 12 and continues sequentially all the way around the groove without the formation of metal fragments.

The blade 1 then rotates out of the flow area of pipe sections 24 and 25, riding smoothly on the two fluorocarbon plastic rings 6 and 6' under the pressure of spiral springs 18. Upon reclosure of the valve by rotation blade 1 into the flow area of pipe sections 24 and 25, by reversing the action of piston chamber 26, the spring loaded fluorocarbon plastic ring 6 bears against the blade and cooperates with ring 6' to reseal the valve within acceptable leakage rates for fuel system shutdown. If desired, a new pre-use sealing mechanism of the invention can be installed to prevent fuel leakage during another prolonged period of non-use of the stored fuel and valve.

Alternately, a unitary structure or a welded unit of retainer 5 and diaphragm 2 can be used instead of the epoxy bonding arrangement described in the foregoing for retaining and sealing the diaphragm 2 to the valve housing or body section 15. The relative dimensions of diaphragm 2, cutter 3, and retainer 5 can be varied to suit individual blade valve design requirements. The diaphragm 2 is made of aluminum alloy or other low shear material. The fluorocarbon plastic rings, and other materials described above, were chosen on the basis of compatibility with hydrocarbon and cryogenic fuels. Fluorocarbon plastic rings 6 and 6' made of fluorocarbon resins sold by E. I. du Pont de Nemours & Co., Wilmington, Del., under the trademark Teflon have been found to be very satisfactory. These resins include tetrafluoroethylene resins and fluorinated ethylene propylene resins. Trifluoromonochloroethylene resins sold by Minnesota Mining & Manufacturing Co., St. Paul, Minn., under the trademark Kel-F also are satisfactory for making rings 6 and 6'. Other materials can, of course, be selected for the same or different fuels.

Obviously, many other modifications and variations of the present invention are possible in the light of the above teachings. It is therefore to be understood that within the scope of the appended claim the invention can be practiced otherwise than as specifically described.

What is claimed is:

A sealed pre-use fluid storage valve comprising: a valve body; a blade valve member mounted for rotary movement about an axis extending in the longitudinal direction of the valve body for opening and closing the valve; a diaphragm sealing member having a base portion fixed to the upstream side of the blade valve member in a pre-use storage closed position and an annular lip portion extending from the base portion in a direction longitudinally of the valve body and being provided with an annular weakened region; an annular retainer mounted on the upstream side of said valve body having a flange engaging the outer surface of said annular lip; an annular cutter member mounted within said retainer and engaging the inner surface of said lip adjacent said weakened region of said annular lip portion of the diaphragm sealing member for cleanly shearing the lip portion upon actuation of the blade valve member, said lip being secured in sealing relationship between said retainer flange and said cutter member; a separate annular sealing member mounted in the valve body on the upstream side of the blade valve member outwardly of said annular retainer and means urging said annular sealing member into fluid sealing relationship with the blade valve member for resealing the valve against fluid leakage after shearing of the diaphragm sealing member, said annular sealing member being held in position by said retainer flange.

References Cited by the Examiner

UNITED STATES PATENTS

| 2,732,170 | 1/1956 | Shand | 251—174 X |
| 3,038,485 | 6/1962 | Hosek | 137—68 |
| 3,039,482 | 6/1962 | Goldberg | 137—68 |
| 3,097,482 | 7/1963 | Lovingham | 137—68 XR |

FOREIGN PATENTS 154,074   11/1920   Great Britain.

ISADOR WEIL, *Primary Examiner.*